Patented Apr. 17, 1934

1,955,023

UNITED STATES PATENT OFFICE 1,955,023

REMOVAL OF PHENOLS FROM HYDROCARBONS CONTAINING THE SAME

Hans Roos, Leverkusen, and Emil Schwamberger, Mainkur, Germany, assignors, by mesne assignments, to Standard-I. G. Company, Linden, N. J., a corporation of Delaware No Drawing. Application February 11, 1933, Serial No. 656,374. In Germany February 12, 1932

6 Claims. (Cl. 260—154)

The present invention relates to the removal of phenols from hydrocarbon mixtures containing the same.

For the separation or recovery of phenols from mineral coal tar oils, use is generally made of extraction with caustic soda but this method is not very advantageous because considerable amounts of caustic soda are wasted unless troublesome regeneration processes are carried out. According to other methods, such as extraction with solvents, the removal of phenol takes place only incompletely and moreover low quality phenols containing neutral oils are obtained.

We have now found that an excellent separation of phenols from substances containing the same together with neutral oils, such as from mineral coal tar oils or fractions thereof, as for example crude benzene, is obtained by adding to the oils liquid paraffinic hydrocarbons such as paraffinic benzines, middle oils, gas oils or paraffinic oils, and aqueous solutions of salts which are readily soluble in phenols but insoluble or slightly soluble in hydrocarbons, especially salts of organic nitrogen bases, the layer containing the phenols which separates then being withdrawn. The phenols can thereupon be recovered in a very pure form from the said layer.

As salts which dissolve readily in phenols but which dissolve but badly in hydrocarbons may be mentioned for example those of organic acids, as for example sodium stearate or soaps, or alkali metal phenolates. Instead of ready-made alkali metal phenolates, an amount of alkali insufficient to neutralize the phenols may be added to the oils. The salts of organic nitrogen bases, in particular of pyridine bases, are especially suitable, as for example pyridine sulphate, pyridine hydrochloride, pyridine phosphate and pyridine salts of sulphonic acids, as for example benzene sulphonic acids. By reason of the fact that nitrogen bases are usually contained in small amounts in mineral coal tar oils, a more or less far-reaching removal of phenol is effected merely by the addition of paraffinic hydrocarbons and acids, as for example 60 per cent sulphuric acid. Since, however, the salts produced by the addition of acid are usually not sufficient for the complete removal of phenols, further amounts of salts of the said kind must be added, or, preferably, after separating the layer containing phenol, a treatment with salts which are readily soluble in phenols but difficultly soluble in hydrocarbons, preferably with sulphates of pyridine bases, must be carried out. By cooling to about zero C. the separation of the phenols is assisted.

It has already been proposed to treat bituminous substances, especially destructive hydrogenation products of mineral coals, or also crude tar, with acids while adding benzine in order to remove asphalt, and at the same time an enrichment of phenols in the separated layer may be observed, but it was not known that this separation was caused by the pyridine salts formed. According to this invention a complete removal of phenol is obtained by adding these salts to mineral coal tar oils.

It has also been proposed to treat tar oils with concentrated aqueous solutions of salts of nitrogen bases, as for example pyridine salts, for the purpose of removing phenols. When no paraffinic hydrocarbons are added, however, large amounts of pyridine salts must be employed and in spite of this only an incomplete removal of phenol is obtained; furthermore considerable amounts of pyridine salts are dissolved by the aromatic tar oils and these, after separation of the phenols must be removed in a further special step of operation. The addition of paraffinic hydrocarbons according to this invention has the result that generally speaking the amount of pyridine salts which would otherwise dissolve in the unmixed tar oil is sufficient for the removal of the phenols. By the addition of paraffinic hydrocarbons, the solubility of the pyridine salts in the dephenolized oils is so strongly suppressed that the latter are obtained free from pyridine salts. The addition of the paraffinic hydrocarbons is not troublesome in many cases, as for example when employing the hydrocarbons as motor fuels.

If, however, it is desired to separate the added paraffinic hydrocarbons from the aromatic hydrocarbons, it is preferable to employ for the mixing a fraction the boiling point range of which is as far distant as possible from that of the tar oil; for example a heavy paraffin oil may be added to light crude benzene, or a benzine which is as light as possible to heavy and middle oils from mineral coal tar. After removing the phenols, the two components may then be readily separated from each other by distillation and the aliphatic component employed again if desired. Instead of benzines, paraffinic hydrocarbons which are gaseous at ordinary temperatures and which have been liquefied by pressure, as for example propane, may be employed and the whole process carried out under pressure.

The amount of paraffinic hydrocarbons added to the tar oils may be equal to that of the latter or less than this, as for example half thereof. In the case of working up hydrocarbon mixtures containing large amounts of aromatic hydrocarbons, as for example mineral coal tar oils, it is preferable to add larger amounts of paraffinic hydrocarbons, as for example 2 or 3 times that of the initial hydrocarbon mixtures, than in the case of initial products consisting mainly of aliphatic hydrocarbons. A considerable excess of paraffinic hydrocarbons, as for example three parts to each part of tar oil, is, however, not injurious. It is not necessary to add pure paraffinic hydrocarbons; a small content of olefines is not injurious. Naphthenic petroleum distillates, as for example from Russian oils, which have a considerable content of paraffinic hydrocarbons are also suitable. Products of the destructive hydrogenation of coals, mineral or tar oils may also be employed when they contain mainly paraffinic hydrocarbons and less than about 30 per cent of aromatic hydrocarbons.

During the separation of the phenols by means of the salt solutions, resins and substances which tend readily to cause resinification or discoloration, are also dissolved out from the oils at the same time, and pass into the distillation residue of the phenols. Therefore when the resulting hydrocarbon mixture is to be employed as a fuel, it is preferable to employ unrefined oils for the mixing, the mixture then being refined after the removal of the phenols, a saving in refining agent, as for example sulphuric acid, being thus obtained as compared with the separate refining of the aromatic and paraffinic oils.

The process according to this invention may be carried out in practice for example as follows:

Mineral coal tar middle oil (carbolic oil) containing from about 25 per cent to about 40 per cent of phenols, has added thereto about the same volume of a paraffinic middle oil, as for example gas oil. An amount of about 60 per cent sulphuric acid corresponding to the nitrogen bases in the carbolic oil is then added and the whole well mixed by blowing air in or by means of a mechanical stirrer. After allowing to settle, two layers are obtained the lower of which contains base sulphates and phenols. The oil forming the upper layer still contains certain amounts of phenol, because the amount of base sulphates is insufficient.

In order to completely remove the phenols from the oil, the oil separated from the lower layer is then treated with from about 1 to about 3 per cent by volume of a concentrated solution of base sulphates, which are obtained as hereinafter described. This treatment of the oil with base sulphates is preferably carried out in counter-current in a mixing column which is filled with Raschig rings or similar fillers, or contains perforated plates, deflecting plates or similar distributing elements of the usual kind. In this manner an oil practically completely free from phenols is obtained which constitutes an excellent fuel for Diesel and other heavy oil engines.

The lower layers rich in phenols obtained in the first and second treatments are combined for further treatment. They contain all the base sulphates and still contain considerable amount of neutral oils, as for example up to 25 per cent, mainly neutral oils of aromatic nature. By washing the lower layers with an oil which is mainly paraffinic, as for example gas oil, the neutral oils are for the greater part dissolved out and there remain but a few per cent of hydrocarbons in the lower layers. This washing also is preferably carried out in a mixing column, the gas oil which is to be mixed with the carbolic oil being used for the purpose. In this manner there is no additional loss of oil and no phenols are lost.

In order to obtain phenols which are soluble in alkali to give clear solutions, the mixture of phenols, base sulphates and some neutral oil is preferably subjected to a further washing with a light benzine which contains little or no olefines or cyclic hydrocarbons. In this way a mixture of phenols, base sulphates and but little benzine is obtained. The benzine used for washing, which contains some aromatic hydrocarbons and about 1 per cent of phenols, may be freed from phenol in any suitable manner, as for example by treatment with base sulphates. It may, however, also be mixed with light mineral coal tar oil (crude benzene) and freed from phenol by mixing with acids or with base sulphates. In this manner a valuable mixture of benzine and benzene free from phenol and a mixture of phenol and sulphate are obtained which if desired may be worked up together with the mineral coal tar middle oil already mentioned.

The mixture of phenols and base sulphates derived from the washing with benzine is then freed, for example by washing with water, from the greater part of the base sulphates. In this case it is also preferable to work in countercurrent columns. It is advantageous to employ water saturated with phenol in order to avoid loss of phenols.

The washed phenol oil contains, besides phenols, a little benzine, base sulphates and a large amount of water. It is then freed from the remainder of the base sulphates, for example by separating the phenols from the base sulphates by distillation under reduced pressure as described in the application Ser. No. 597,808, filed March 9th, 1932. The first runnings consist of water together with the benzine and a little phenol. The major portion of the distillate is a colorless pure mixture of phenols which dissolves in caustic soda solution to give a clear or only slightly turbid solution and which may be further worked up into commercial carbolic acid by distillation in a column in the usual manner.

The base sulphates are withdrawn from the residue remaining after the vacuum distillation by washing with water in the usual manner. The solution of base sulphates thus obtained may be combined with that obtained from the washing already described. In order to obtain therefrom a solution suitable for the removal of phenols it is evaporated for example until its density is from about 1.2 to about 1.5. If the sulphate is employed in a less concentrated solution, a third layer is obtained during the removal of phenol, the said layer consisting mainly of water. During the concentration of the resulting sulphate solution, phenol water is obtained in the distillate and this may be employed for washing the mixture of phenols and base sulphates in the manner already described. The excess of sulphate which is not used again for the removal of phenols may be neutralized with ammonia in the usual manner, the bases being recovered.

We have further found that the process hereinbefore described is also eminently suitable for the removal of phenols from petroleums and their distillates, especially those which have previously been refined in the usual manner by treatment with phenols or aqueous solutions of phenols and have thereby acquired a content of phenols. A special addition of liquid paraffinic hydrocarbons may be dispensed with in this case because they are already contained in sufficient amount in the petroleums.

It has also been found that the said process is also eminently suitable for the removal of phenols from liquid destructive hydrogenation products of coals and tars and their distillates. A special addition of liquid paraffinic hydrocarbons may usually be dispensed with in this case because they are frequently contained in sufficient amount in the destructive hydrogenation products.

The following examples will further illustrate the nature of this invention but the invention is not restricted to these examples. The parts are by weight.

Example 1

100 parts of a light oil derived from mineral coal tar (crude benzene) containing 8 per cent of phenols and 0.5 per cent of pyridine bases are mixed with 100 parts of a paraffinic crude benzine and treated in a counter-current apparatus with 2 parts of a concentrated aqueous solution of acid pyridine sulphate. 191 parts of a mixture of benzene and benzine of pale color which is practically free from phenols, and 11 parts of a mixture of about 8 parts of phenols, 2 parts of pyridine sulphate and 1 part of light neutral oil are obtained, the light neutral oil being obtained as first runnings during the distillation of the phenols. The phenols are obtained in the form of pure crystallized carbolic acid and of cresols which dissolve in alkali to give a clear solution.

Example 2

100 parts of mineral coal tar middle oil (carbolic oil) containing 25 per cent of phenols and 2 per cent of nitrogen bases are thoroughly mixed with 100 parts of American gas oil and 2.5 parts of 65 per cent sulphuric acid. After allowing to settle, two layers are obtained. The lower consists of a mixture of 4.5 parts of base sulphates, 11 parts of phenols and about 1.5 parts of neutral oil and the upper consists of an oil which still contains 7 per cent of phenols. This oil (185 parts) is treated in a counter-current apparatus with 6 parts (about 3 per cent) of a concentrated aqueous solution (specific gravity 1.27) of neutral sulphates of crude pyridine bases, 168 parts of a mixed oil consisting of aromatic and paraffinic hydrocarbons having a phenol content of less than 0.5 per cent and 23 parts of a phenol oil containing 6 parts of base sulphates and about 4 parts of neutral oil are obtained. This phenol is added to that obtained in the first stage and subjected to a washing in counter-current first with 100 parts of gas oil and then with 80 parts of benzine. The neutral oil content is thus reduced to a few per cent, so that finally a mixture of 23 parts of phenols, 10 parts of base sulphates and 1 part of benzine is obtained, about 7 parts of base sulphates being removed by washing in counter-current with 70 parts of water. Then, by distillation in vacuo, water and about 1.5 parts of benzine containing phenols are obtained as first runnings, the main fraction consisting of about 20 parts of pure phenol and homologues (cresols and xylenols) passes over and the base sulphates remain in the residue consisting of higher phenols and resins and may be recovered therefrom by the usual methods.

Example 3

100 parts of a fraction (boiling range from about 260° to about 320° C.) derived from Pennsylvanian crude oil, which has been treated in the usual manner with phenol for the purpose of removing saturated resinous and discoloring constituents and which has a phenol content of about 2 per cent, are treated in a counter-current apparatus with 1 part of a concentrated aqueous solution (specific gravity 1.3) of the sulphates of crude pyridine bases derived from the working up of mineral coal tar. An oil practically free from phenols is obtained. The phenol and the sulphates of the bases are recovered from the phenol layer in the manner already described.

Example 4

100 parts of a middle oil having a phenol content of 15 per cent obtained by the destructive hydrogenation of brown coal low-temperature carbonization tar are washed in a counter-current apparatus (columns) with 5 parts of a concentrated aqueous solution of sulphates of pyridine bases having a specific gravity of 1.25. 80 parts of a middle oil practically free from phenols and 25 parts of a heavy phenol oil are obtained. The latter may be worked up to pure phenol in the manner already described.

What we claim is:—

1. A process for dephenolizing a liquid hydrocarbon product containing phenol which comprises treating said product with a liquid paraffinic hydrocarbon and an aqueous solution of a salt, which is readily soluble in phenols but at the most slightly soluble in hydrocarbons, the phenol thus being dissolved in the said aqueous solution, and then separating the aqueous solution from the body of hydrocarbons.

2. A process for dephenolizing a mineral coal tar oil which comprises treating said oil with a liquid paraffinic hydrocarbon and an aqueous solution of a salt of an organic nitrogen base, the phenol contained in the said mineral coal tar oil thus being dissolved in the said aqueous solution, and then separating the aqueous solution from the body of hydrocarbons.

3. A process for dephenolizing a mineral coal tar oil containing besides phenol an amount of organic nitrogen bases which comprises treating said oil with a liquid paraffinic hydrocarbon, an amount of aqueous sulphuric acid equivalent to the said amount of organic nitrogen bases, part of the phenol thus being dissolved in the aqueous solution of the resulting salt of the organic nitrogen bases, separating this aqueous solution containing phenol from the body of hydrocarbons, treating the latter with a further amount of an aqueous solution of a salt of an organic nitrogen base, the remainder of the phenol contained in the said hydrocarbons thus being dissolved in the said aqueous solution, and finally separating this solution from the remaining body of hydrocarbons.

4. A process for dephenolizing a mineral coal tar oil which comprises treating said oil with a liquid paraffinic hydrocarbon and an aqueous solution of a salt of an organic nitrogen base, the phenol contained in the said mineral coal tar oil thus being dissolved in the said aqueous solution, separating the aqueous solution from the body of hydrocarbons, and washing this solution with a liquid paraffinic hydrocarbon in order to dissolve out therefrom the neutral parts of the mineral coal tar oil contained therein.

5. A process for dephenolizing a mineral oil containing phenol which comprises treating said oil with a liquid paraffinic hydrocarbon and an aqueous solution of a salt of an organic nitrogen base, the phenol contained in the said mineral oil thus being dissolved in the said aqueous solution, and then separating the aqueous solution from the body of hydrocarbons.

6. A process for dephenolizing a destructive hydrogenation product of a carbonaceous material of the nature of coals and tars which comprises treating said product with a liquid paraffinic hydrocarbon and an aqueous solution of a salt of an organic nitrogen base, the phenol contained in the said hydrogenation product thus being dissolved in the said aqueous solution, and then separating the aqueous solution from the body of hydrocarbons.

HANS ROOS.
EMIL SCHWAMBERGER.

DISCLAIMER 1,955,023.—*Hans Roos* and *Emil Schwamberger*, Leverkusen, Mainkur, Germany. REMOVAL OF PHENOLS FROM HYDROCARBONS CONTAINING THE SAME. Patent dated April 17, 1934. Disclaimer filed October 24, 1936, by the assignee, *Standard-I. G. Company*.

Hereby disclaims from the scope of claim 3 of the said Letters Patent all processes wherein the first-mentioned treatment of said oil with sulfuric acid is carried out in the presence of added quantities of a previously formed salt of an organic nitrogen base.

[*Official Gazette November 17, 1936.*]

oil thus being dissolved in the said aqueous solution, and then separating the aqueous solution from the body of hydrocarbons.

6. A process for dephenolizing a destructive hydrogenation product of a carbonaceous material of the nature of coals and tars which comprises treating said product with a liquid paraffinic hydrocarbon and an aqueous solution of a salt of an organic nitrogen base, the phenol contained in the said hydrogenation product thus being dissolved in the said aqueous solution, and then separating the aqueous solution from the body of hydrocarbons.

HANS ROOS.
EMIL SCHWAMBERGER.

DISCLAIMER 1,955,023.—*Hans Roos* and *Emil Schwamberger*, Leverkusen, Mainkur, Germany. REMOVAL OF PHENOLS FROM HYDROCARBONS CONTAINING THE SAME. Patent dated April 17, 1934. Disclaimer filed October 24, 1936, by the assignee, *Standard-I. G. Company*.

Hereby disclaims from the scope of claim 3 of the said Letters Patent all processes wherein the first-mentioned treatment of said oil with sulfuric acid is carried out in the presence of added quantities of a previously formed salt of an organic nitrogen base.

[*Official Gazette November 17, 1936.*]